N. P. ALBERTSON.
FRAME ELEVATING MEANS FOR SHOCK LOADERS.
APPLICATION FILED JAN. 19, 1918.
1,337,874.
Patented Apr. 20, 1920.
5 SHEETS—SHEET 1.
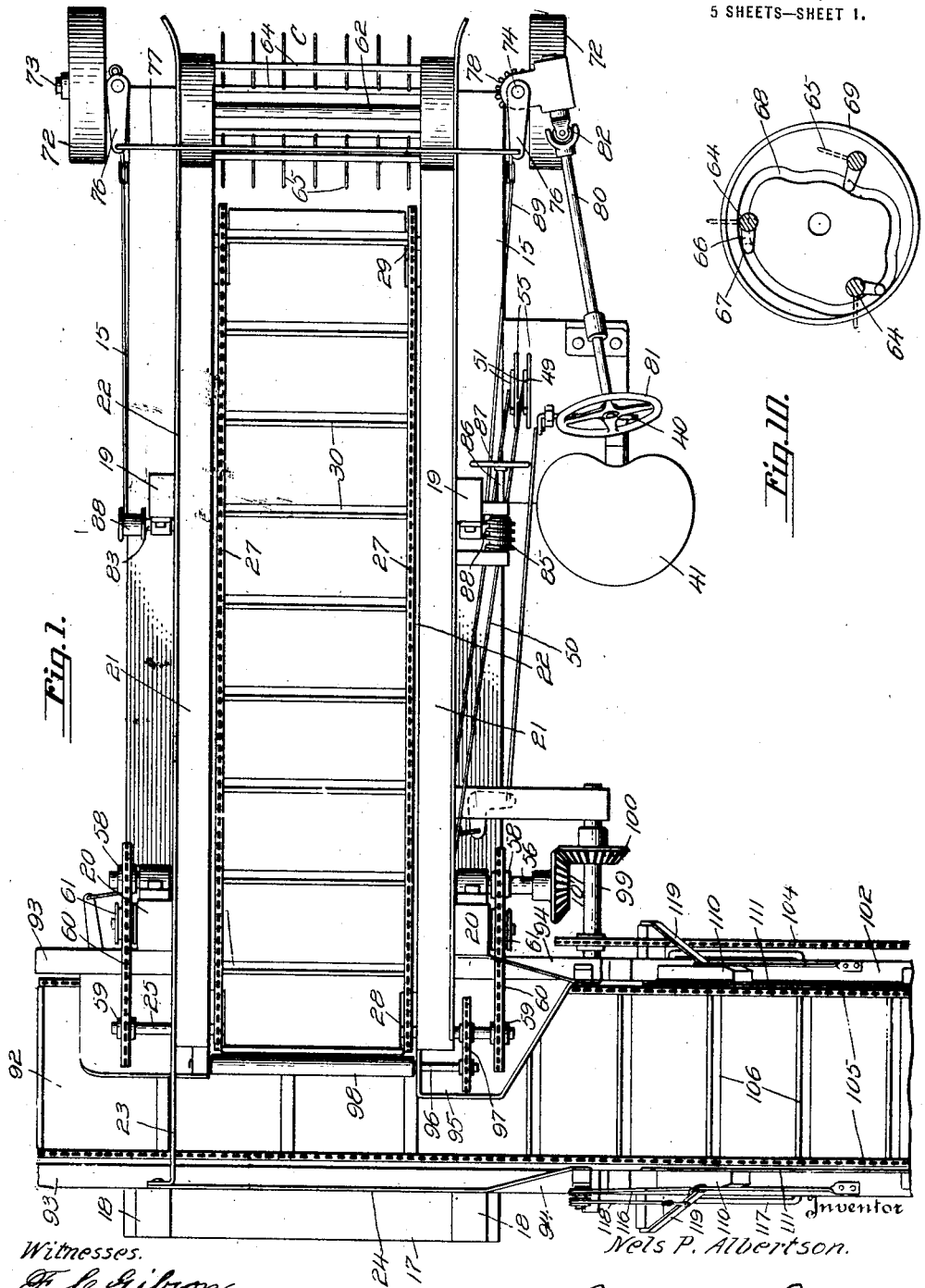

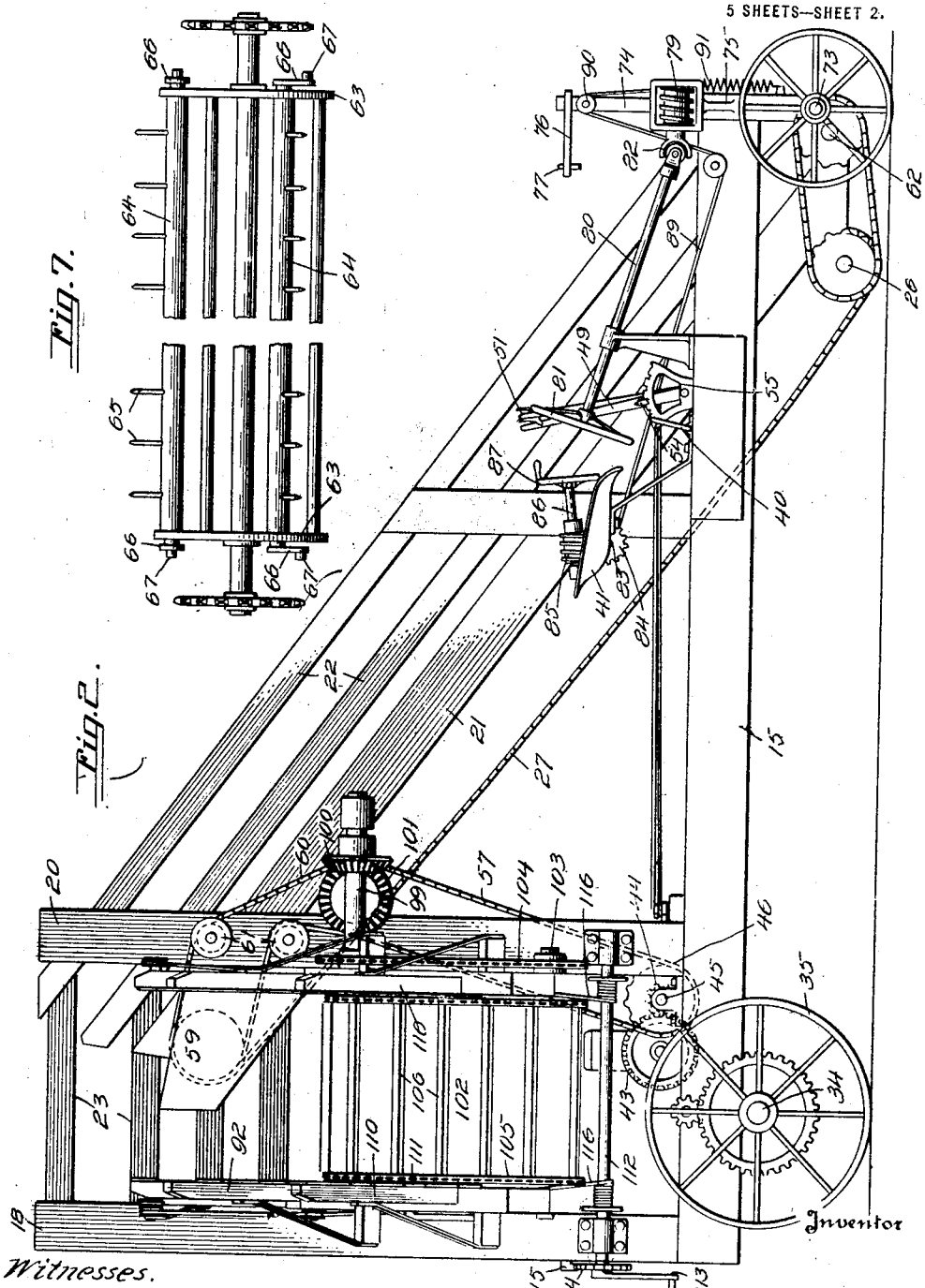

N. P. ALBERTSON.
FRAME ELEVATING MEANS FOR SHOCK LOADERS.
APPLICATION FILED JAN. 19, 1918.
1,337,874.
Patented Apr. 20, 1920.
5 SHEETS—SHEET 3.
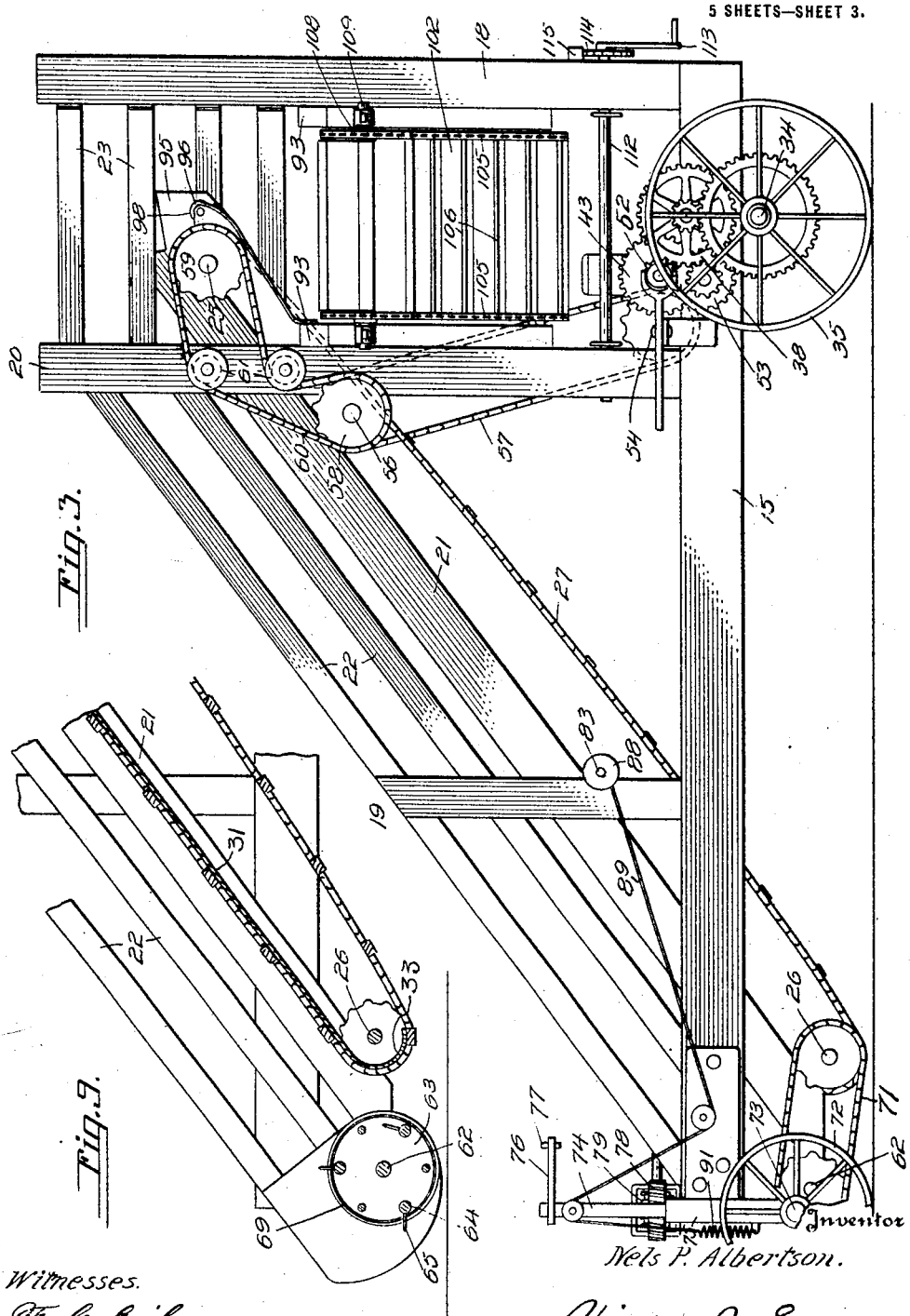
Witnesses.
F. C. Gibson.
Inventor
Nels P. Albertson.
By Victor J. Evans
Attorney N. P. ALBERTSON.
FRAME ELEVATING MEANS FOR SHOCK LOADERS.
APPLICATION FILED JAN. 19, 1918.
1,337,874.
Patented Apr. 20, 1920.
5 SHEETS—SHEET 4.
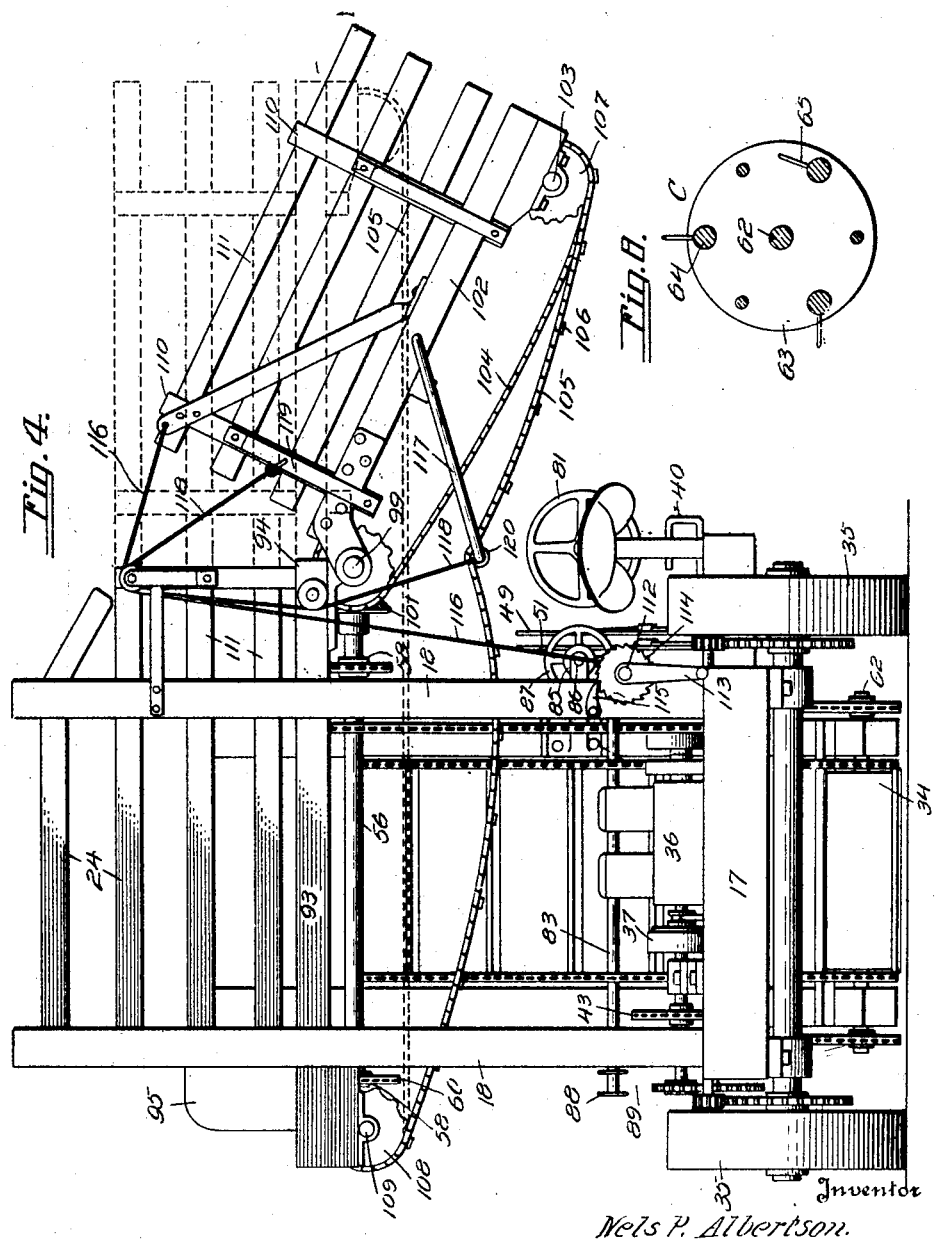

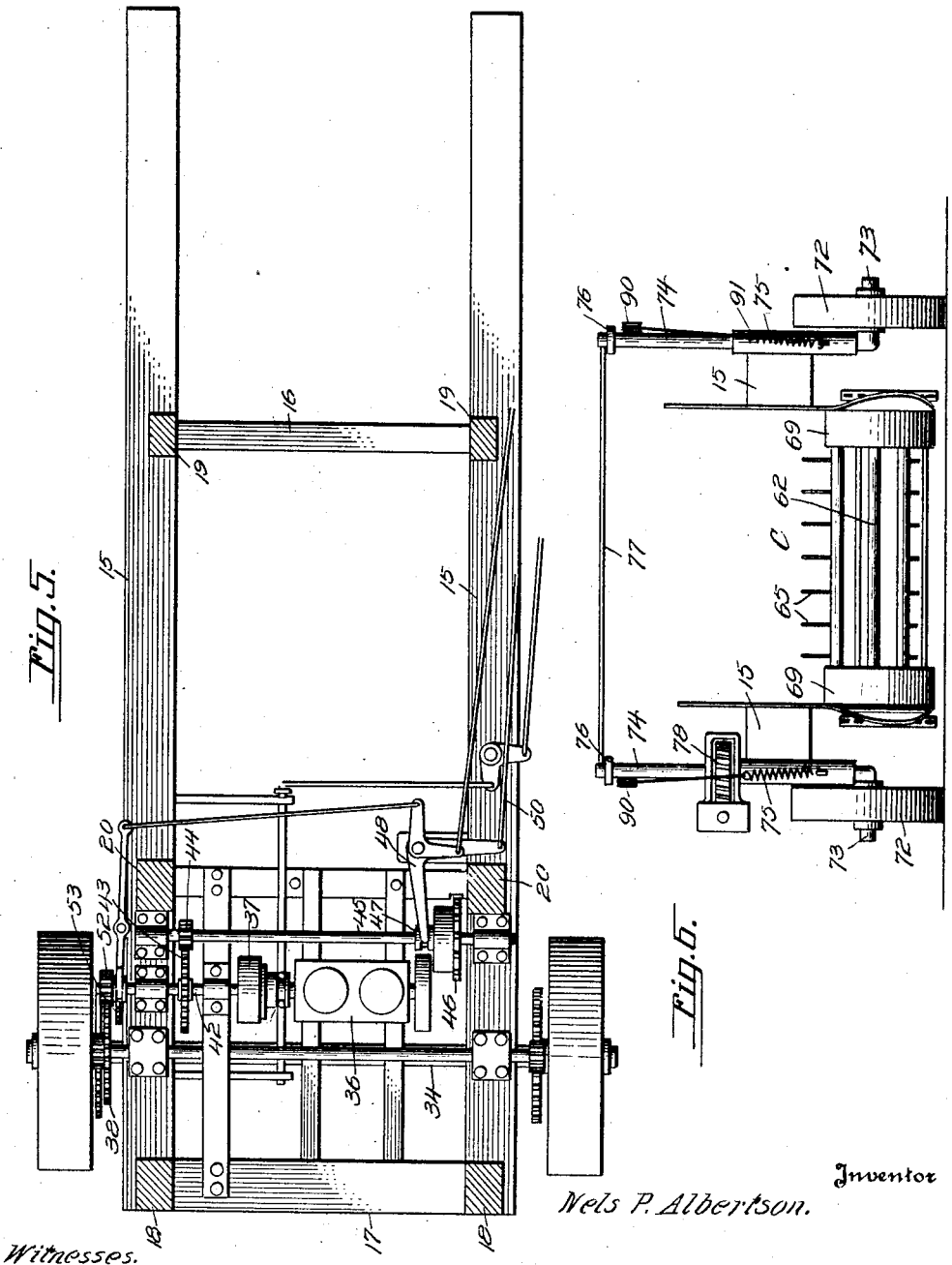

UNITED STATES PATENT OFFICE.

NELS PETER ALBERTSON, OF FRANKFORT, SOUTH DAKOTA.

FRAME-ELEVATING MEANS FOR SHOCK-LOADERS.

1,337,874.    Specification of Letters Patent.    Patented Apr. 20, 1920.

Application filed January 19, 1918. Serial No. 212,672.

*To all whom it may concern:*

Be it known that I, NELS PETER ALBERTSON, a citizen of the United States, residing at Frankfort, in the county of Spink and State of South Dakota, have invented new and useful Improvements in Frame-Elevating Means for Shock-Loaders, of which the following is a specification.

The object of my present sole invention is the provision of simple, durable and reliable frame-elevating means for shock loaders.

To the attainment of the foregoing, the invention consists in the improvement as hereinafter described and claimed.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:—

Figure 1 is a top plan view of a machine constructed in accordance with the invention.

Fig. 2 is a side elevation.

Fig. 3 is a side elevation of the machine as viewed from the opposite side.

Fig. 4 is a rear elevation.

Fig. 5 is a top plan view of the machine with the elevator and the transverse conveyer removed.

Fig. 6 is a front view of the steering gear.

Fig. 7 is a detail view of the pick-up cylinder.

Fig. 8 is a detail transverse section of the pick-up cylinder.

Fig. 9 is a detail longitudinal section showing the relation of the pick-up cylinder and the elevating conveyer.

Fig. 10 is a detail view of the cam mechanism complementary to the pick-up cylinder.

Corresponding parts in the several figures are denoted by like characters of reference.

The main frame of the improved machine comprises a pair of longitudinal sills 15 which are connected together by cross bars 16, 17, the latter being the rear cross bar. Rising from the sills are posts or uprights, two of which 18, 18 are located at the rearward ends of the sills; two other posts 19, 19 are located relatively near the front ends of the sills and intermediate posts 20, 20 are located intermediate the rear posts and the front posts as shown. The side rails 21 of the elevator frame are supported by the front and intermediate posts 19, 20, being secured on the near faces of said posts in a downwardly and forwardly inclined position, said side rails being extended downwardly between the sills 15 on the near faces of which the lower ends of the side rails are secured. The side rails 21 are secured a material distance below the upper ends of the posts 19, 20 to provide ample room for the guard rails 22. Guard rails 23 are also secured on the posts 18, 20 at one side of the machine, and other guard rails 24 are secured on the front faces of the rear posts 18, this arrangement being resorted to in order to prevent material from dropping at one side of the machine while leaving an opening at the other side of the machine whereby material coming over the elevator may be discharged laterally with respect to the frame structure of the machine. Conveying means to be hereinafter described will be provided to take care of material thus discharged.

Supported at or adjacent to the upper and lower ends of the elevator frame are shafts 25, 26 over which the elevating conveyer is trained, said conveyer comprising chains 27 trained over sprocket wheels 28, 29 on the respective shafts 25, 26, said chains being connected at intervals by slats 30. The side rails 21 support a bottom member 31 which may be advantageously constructed of sheet metal, said bottom member being bent around the shafts at the upper and lower ends so as to form shields or housings, one of which 33 is shown in Fig. 9, whereby the material that is being elevated will be guided free from entanglement with the elevator shafts.

The rearward end of the main frame is supported on an axle 34 having ground wheels 35. The frame structure also supports a motor 36 from which power is transmitted through means including a clutch 37 an appropriate gearing 38 to the ground wheels for the propulsion of the machine. The clutch 37 is operable by means including suitable connections and a foot lever 40, the latter being arranged in suitable proximity to the driver's or operator's seat which is shown at 41.

The motor driven shaft 42 having the clutch 37 is provided with a spur wheel 43 meshing with a pinion 44 on a countershaft 45. The countershaft 45 carries a sprocket gear 46 which through the medium of a clutch device 47 may be connected with the shaft for rotation therewith or disconnected therefrom as may be required. The clutch device is operable by a bell crank 48 which in turn is operated by a hand lever 49 located near the driver's seat, said hand lever being connected to the bell crank by a rod 50. Another hand lever 51 is used for controlling a reversing gear 52 with which it is connected by connecting means 53 of well known construction which it is not necessary to describe in detail. Each of the hand levers 49 and 51 is provided with a latch device 54 engaging a segment rack 55 whereby the respective hand levers and the parts controlled thereby will be retained in adjusted positions.

The sprocket wheel 46 on the shaft 45 is utilized for driving a countershaft 56 with which it is connected by a transmission chain 57, it being understood that the transmission of motion may be interrupted at will through the medium of the clutch 47. The countershaft 56 is provided adjacent to the ends thereof with sprocket wheels 58 and the upper elevator shaft 25 is provided with sprockets 59, receiving motion through the medium of chains 60 from the sprockets on the countershaft 56, the chains being guided over idlers 61. The elevator may thus be driven and the motion thereof may be interrupted at the will of the operator.

Supported for rotation adjacent to the lower end of the elevator frame is a shaft 62 carrying the pick-up cylinder generally designated by C said cylinder comprising heads 63 in which are journaled feathering shafts 64 said shafts having regularly extended pins or spikes 65 and said shafts being provided at the ends thereof with arms 66 provided with pins or anti-friction members 67, traveling in cam grooves 68 in housings 69 surrounding the heads 63, the cam grooves being so conformed that the shafts will be rocked to present the pins or spikes 65 in an outward direction when material such as a sheaf or shock of grain is engaged thereby to carry such material over the cylinder, the shafts being rocked or feathered so as to tilt the spikes to an inclined position enabling them to let go of the material as the latter is being deposited on the lower end of the elevator. The cylinder shaft 62 receives motion from the lower elevator shaft 26 through the medium of chain transmission 71, Fig. 3.

The front end of the frame of the machine is supported on steering wheels 72 each of which is journaled on a spindle 73 at the lower end of a perpendicular shaft 74, said shafts being guided through bearings 75 at the two sides of the frame structure. The shafts 74 are provided adjacent to their upper ends with rearwardly extending arms 76, said arms being pivotally connected with the ends of a connecting rod 77 which extends transversely across the lower end of the elevator being, however, sufficiently spaced above the elevator so that it will not interfere with passage of material carried by the elevator. One of the shafts 74 carries a worm gear 78 mounted thereon in such manner as not to prevent lifting of the frame and meshing with a worm 79 at one end of a steering shaft 80 which latter is provided at its rearward end with a hand wheel 81 located in a position to be conveniently grasped and actuated by the operator. The steering shaft 80 includes a universal joint 82 so that it will readily adapt itself to the different positions of parts actuated thereby. It will be readily seen that by means of the steering shaft the perpendicular shaft 74 carrying the worm gear 78 may be rotated, the connecting rod 77 serving to transmit motion between the two perpendicular wheel carrying shafts so that they will operate in unison for the proper steering of the machine.

For the purpose of effecting vertical adjustment of the front end of the frame structure there is provided a shaft 83 that extends transversely beneath the elevator frame, said shaft carrying a worm gear 84 meshing with a worm 85 on a shaft 86 having a hand wheel 87 whereby it may be rotated, thus rotating the shaft 83. The latter is provided with winding drums 88 with which the rearward ends of flexible elements such as cables 89 are connected, said cables being guided over suitable guiding elements including pulleys 90 supported at the upper ends of the perpendicular shafts 74. The front ends of the cables 89 are connected with the upper ends of contractile springs 91 the lower ends of which are connected with the sleeves or bearing members 75 through which the shafts 74 are guided. It will be evident that by rotating the shaft 83 in one direction the cables 89 will be wound on the drums 88, thereby exerting a lifting action on the sleeves or bearing members 75 which are connected with the front end of the frame structure which will thus be raised or elevated, it being supported with a proper degree of resiliency by means of the springs 91. When the shaft 83 is reversely rotated, the front end of the frame structure will gravitate in a groundward direction. The front end of the frame structure will be retained at the desired adjustment by the interengaging worm and gear 85, 84. It is obvious that at any adjustment of the frame structure the steering wheels remain in ground engaging position.

Mounted between the rear posts or uprights 18 and the intermediate posts 20, below the discharge end of the elevator is a transversely disposed platform 92, the same being included between and supported by transversely disposed side rails 93, the latter being extended to form brackets 94 at one side of the frame structure where there are no guard rails, Fig. 4. Shields or housings 95 are provided to inclose the transmission gearing at the upper end of the elevator in such a manner and of such an extent as to prevent material passing over the elevator being entangled with the gearing. The housings 95 afford bearings for the ends of a shaft 96 which is driven by a chain transmission 97 from the upper elevator shaft 25, said shaft 96 carrying a roller 98 which, being driven in the same direction as the elevator, will facilitate the discharge of material from the latter. The brackets 94 provide bearings for the ends of a shaft 99 which is driven from the countershaft 56 through the medium of intermeshing bevel gears 100 and 101 on the shafts 99 and 56 respectively.

Pivoted on the shaft 99 is an extension frame 102 which extends in a line with the transversely disposed platform 92, said frame including side rails and a bottom member. Journaled at the outer end of the extension frame 102 is a shaft 103 which is driven by a chain transmission 104 from the shaft 99. An endless conveyer comprising chains 105 and slats 106 is guided over the platform 92 and the extension frame 102, said conveyer being trained over sprocket wheels 107 on the shaft 103 and over sprocket wheels 108 on a shaft 109 at the end of the platform 92 distant from that with which the extension frame is connected. This endless conveyer will obviously be driven by the means whereby motion is transmitted to the shaft 103 as hereinbefore described. The extension frame is provided with uprights 110 rising from the side rails thereof and serving to support guard rails 111 whereby material is prevented from dropping over the sides of the extension frame.

For the purpose of effecting adjustment of the outer free end of the extension frame 102 in a vertical plane in order to dispose the same in the most advantageous position for successful operation, there is provided a drum shaft 112 having a crank 113 and a ratchet wheel 114 engaged by a dog or pawl 115 for the purpose of preventing reverse rotation of the drum shaft. The latter is connected with some of the uprights 110 on the side rails of the extension frame by means of suitably guided flexible elements such as cables 116 whereby, when the drum shaft is rotated in one direction to wind the cables thereon, the free end of the extension frame will be lifted while, when the drum shaft is rotated in the other direction, the free end of the extension frame will gravitate in a downward direction. The interengaging pawl and ratchet are obviously provided to sustain the extension frame at the desired adjustment.

When the outer end of the extension frame is lowered it is evident that the lower flight of the conveyer guided over said frame and over the platform 92 will sag to a suitable extent. In order to support the sagging portion of the conveyer there is provided a yoke 117 the ends of the limbs of which are pivotally connected with the side rails of the extension frame, the bridge portion of the yoke extending beneath the lower flight of the conveyer. Said yoke is connected by a suitably guided flexible element such as a cable 118 with a brace 119 adjacent to one of the uprights 110. When the extension frame is in an approximate horizontal position, as shown in dotted lines in Fig. 4, the conveyer will be substantially taut and the yoke 117 will gravitate in a downward direction. When, on the other hand, the free end of the extension frame is lowered, the bridge portion of the yoke will be pulled in an upward direction, thus affording a support for the sagging portion of the lower flight of the conveyer. The bridge portion of the yoke may be provided with an anti-friction roller 120.

From the foregoing description taken in connection with the drawings hereto annexed, it will be seen that a simple and effective machine is provided which may be utilized for picking up material such as sheaves or shocks of grain, hay and the like from the field, and for elevating and loading the same. The machine is motor driven; the steering means are simple and effective; the pick-up cylinder, owing to the feathering action of parts thereof, will unfailingly pick up material lying in the path thereof and release such material as soon as deposited on the elevator. It will also be seen that the propulsion means of the machine as well as the means for controlling the moving parts thereof are simple and of such a nature as to place all the moving parts within complete control of the driver or operator.

Having described the invention what I claim as new is:

1. In a machine of the class described, a main frame, a rear axle supporting the same and having ground wheels, a motor supported on the frame, vertically movable bearing members carried at the front end of the frame, perpendicular shafts disposed in said bearing members and connected to move together and having spindles, steering wheels on the spindles, a shaft having winding drums, contractile and flexible elements connecting said bearing members with the winding drums, guide means at the upper ends of the perpendicular shafts over which the flexible elements are guided, means connected with one of the perpendicular shafts for turning the same about their axes, and means including a worm and worm gear for rotating the shaft having winding drums.

2. In a machine of the class described, a main frame, a rear axle supporting the same and having ground wheels, a motor supported on the frame, bearing members at the front ends of the frame, perpendicular shafts in said bearings and having spindles, steering wheels on the spindles, a shaft having winding drums, flexible elements connecting said bearing members with the winding drums, guide means at the upper ends of the perpendicular shafts over which the flexible elements are guided and means including a worm and worm gear for rotating the shaft having winding drums.

3. In a machine of the class described, a main frame having sills, side members, an axle supporting the rear end of the main frame and having ground wheels, bearing members at the forward ends of the sills, perpendicular shafts in said bearing members and having spindles at their lower ends, steering wheels on said spindles, radial rearwardly extending arms near the upper ends of the perpendicular shafts, a connecting rod pivotally connected with said arms, a worm gear fixed on one of the shafts, a steering rod having a universal joint, a worm at one end of said shaft meshing with the worm gear, a steering wheel at the other end of the steering shaft, contractile cables connected with the bearing members and guided on the perpendicular shaft, and means for taking up and letting off said cables and for preventing casual loosening of the same.

4. In a machine of the class described, a main frame having sills, side members, an axle supporting the rear end of the main frame and having ground wheels, bearing members at the forward ends of the sills, perpendicular shafts in said bearing members and having spindles at their lower ends, steering wheels on said spindles, radial rearwardly extending arms near the upper ends of the perpendicular shafts, a connecting rod pivotally connected with said arms, a worm gear fixed on one of the shafts, a steering rod having a universal joint, a worm at one end of said shaft meshing with the worm gear and a steering wheel at the other end of the steering shaft, in combination with a shaft having winding drums, flexible and contractile elements connecting the winding drums with the bearing members in which the perpendicular shafts are disposed, guide means for said flexible elements including guide members at the upper ends of the perpendicular shafts and means for rotating the shaft for winding drums.

In testimony whereof I affix my signature.

NELS PETER ALBERTSON.